(12) United States Patent
Kremmin et al.

(10) Patent No.: US 7,837,207 B2
(45) Date of Patent: Nov. 23, 2010

(54) CHASSIS ADJUSTMENT SYSTEM

(75) Inventors: Randy Kremmin, Windom, MN (US);
Casey Steffensen, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 139 days.

(21) Appl. No.: 12/194,284

(22) Filed: Aug. 19, 2008

(65) Prior Publication Data

US 2010/0044980 A1   Feb. 25, 2010

(51) Int. Cl.
*B60S 9/10* (2006.01)
*B60G 17/04* (2006.01)

(52) U.S. Cl. ............... 280/43.22; 280/5.514; 280/6.157; 180/900

(58) Field of Classification Search ............... 280/5.514, 280/6.15, 6.154, 6.155, 6.156, 6.157, 43.17, 280/43.22, 638; 180/900; 56/10.2 E
See application file for complete search history.

(56) References Cited

U.S. PATENT DOCUMENTS 3,236,324 A * 2/1966 Levratto ..................... 180/234
4,619,340 A * 10/1986 Elmer et al. ................. 180/209
5,704,959 A * 1/1998 Lisec .......................... 65/174
6,257,361 B1   7/2001 Dickson
6,454,294 B1   9/2002 Bittner

OTHER PUBLICATIONS

Deere Sales Manual (website), High Clearance, http://salesmanual.deere.com/sales/salesmanual/en_NA/sprayers/attachments/high_clearance/4730_4830_high_clearance_feature.html.
Deere Sales Manual (website), Auto Air-Spring, http://salesmanual.deere.com/sales/salesmanual/en_NA/sprayers/attachments/frame_chassis/4730_4830_auto_air_leveling.html.

* cited by examiner

*Primary Examiner*—Paul N Dickson
*Assistant Examiner*—Keith Frisby
(74) *Attorney, Agent, or Firm*—Merchant & Gould

(57) ABSTRACT

A machine, such as a mobile asset, vehicle, or agricultural vehicle, includes a chassis, an adjustment system, and a wheel. The adjustment system replaces a conventional non-extendable leg connected between the chassis and the wheel of the machine. The adjustment system can extend and withdraw in length, such that the height of the machine can vary as needed.

20 Claims, 10 Drawing Sheets

CHASSIS ADJUSTMENT SYSTEM

BACKGROUND

1. Field of the Invention

The present invention relates to an adjustment system and, more particularly, to an adjustment system to move a chassis of a mobile asset up and down as desired.

2. Description of Related Art

High clearance machines have been known for years. More specifically, high clearance agricultural vehicles are well known.

High clearance agricultural vehicles are particularly useful in spraying row crops. For instance, these vehicles are typically designed for use with maturing corn of four or five feet in height, and in order to avoid damage to the crop, the vehicles have a general clearance at least equal to the height of the rows of crops (hence the vehicles are relatively tall pieces of equipment). These vehicles generally have at least two drive wheels having a width that allows the vehicle to pass between two different crop rows. The vehicles may be equipped with a boom that extends outwardly from both sides of the vehicle to spray relatively large crop areas at a time.

In one manner of application, sprays are applied to the crops during the tilling stage when the crops are quite small and a conventional ground-type crop sprayer could traverse the field without causing damage to the small plants. Conventional ground supported crop sprayers, however, are usually not suitable during the latter stages of growth. For example, during the stem extension stage, the likelihood of damage to the standing crops increases if the spray is applied by a ground traversing conventional crop sprayer.

Conventional crop sprayers are even more unsuitable for applying agricultural sprays during the heading and ripening stage of the crop. In order to obtain a good crop yield, however, it is often necessary to apply spray, for example, a fungicide, during these stages especially to crops such as, wheat, barley, and the like. Spraying at these latter stages of growth has been typically done by aerial spraying in order to avoid damage to the standing crop. The effectiveness of aerial spraying is dependent in large part upon the weather conditions, and even then, the application of the spray is not as effective as ground spraying if damage to the standing crop can be avoided. Further, the spray must be concentrated when applied by crop aerial dusting because of the limitations of the capacity of the aerial sprayer.

What is needed is an adjustment system to vary the height of a vehicle to enable the vehicle to spray a matured crop, while not damaging same. It is to such a device and system that embodiments of the present invention are directed.

SUMMARY

In one aspect, a machine, such as a mobile asset, vehicle, or agricultural vehicle, includes a chassis, an adjustment system, and a wheel. The adjustment system replaces a conventional non-extendable leg connected between the chassis and the wheel of the machine. The adjustment system can extend and withdraw the length of a leg, such that the height of the machine can vary as needed.

For example, the adjustment system includes a hydraulic assembly for extension of the adjustment system, a first connection element for connecting to the chassis of the machine, and a second connection element for connecting to the wheel of the machine. As the hydraulic assembly extends, the length of the adjustment system increases. As a result, the chassis moves away from a surface, upon which the machine rests or rides upon. Because the chassis moves away from the surface, the gap between the chassis and the surface increases. As a result, it is easier to spray a more mature crop. Oppositely, as the hydraulic assembly contracts, the length of the adjustment system decreases. Consequently, the chassis moves towards the surface, and the gap between the chassis and the surface is reduced.

These and other objects, features, and advantages of the present invention will become more apparent upon reading the following specification in conjunction with the accompanying drawing figures.

DETAILED DESCRIPTION

Figure 1:
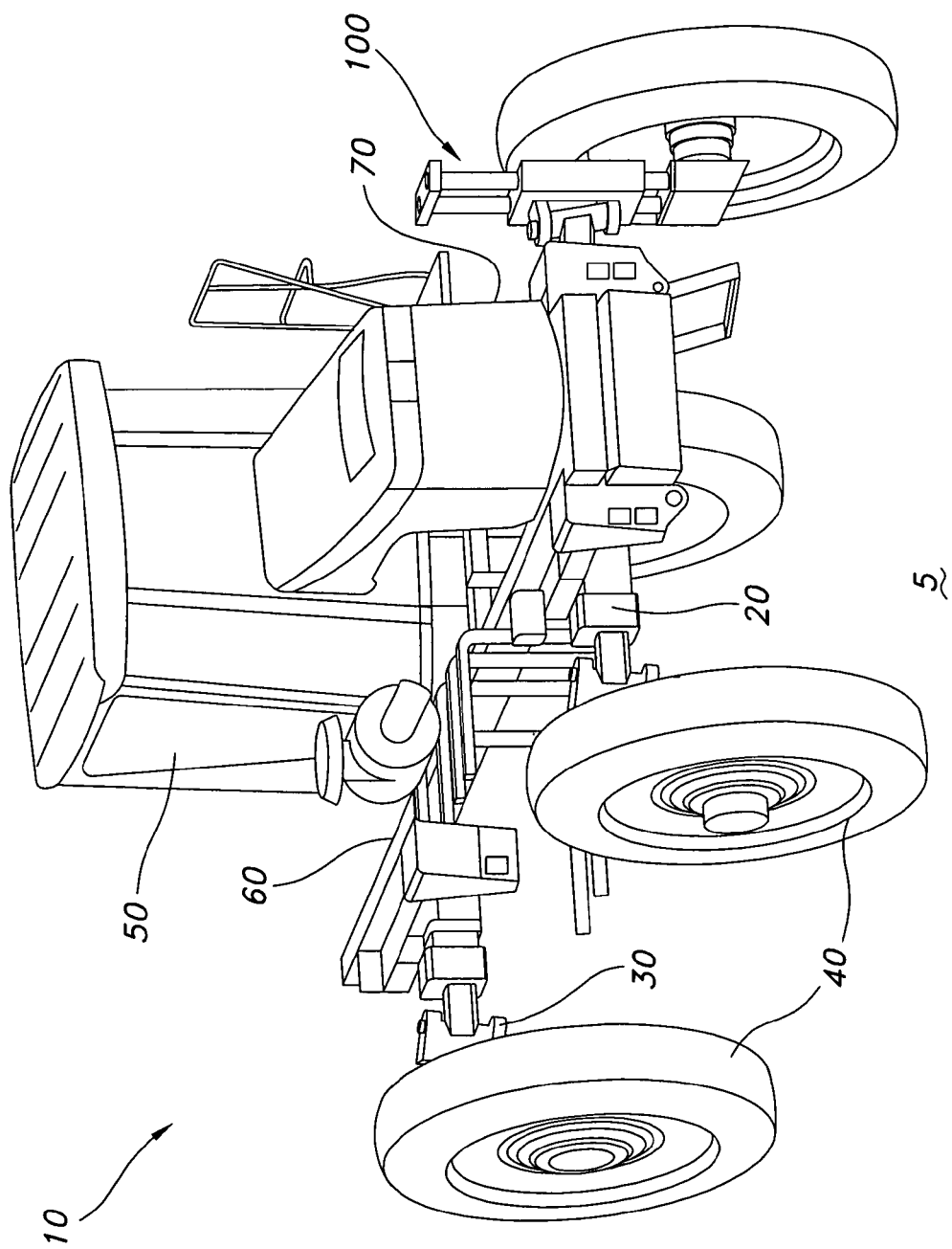
FIG. 1 is a perspective view of a machine comprising an adjustment system, in accordance with an exemplary embodiment of the present invention.

To facilitate an understanding of the principles and features of the invention, it is explained hereinafter with reference to its implementation in an illustrative embodiment. In particular, it is described in the context of being an adjustment system for a machine. The invention is also described in the context of an adjustment system for varying the height of a chassis of a mobile asset or vehicle.

The invention, however, is not limited to its use as an adjustment system for varying the height of a machine. Rather, the invention can be used when an adjustment system is desired or necessary. Thus, the system described hereinafter as an adjustment system can also find utility as a system for other applications, beyond that of a mobile asset or vehicle.

Though described herein based on figures as "up" and "down", one skilled in the art would appreciate that these terms relate to movement in the same plane. That is to say that the present invention contemplates movement at vertical, horizontal, and angled trajectories, as desired. Thus, when the terms "up" and "down" are used herein, they are only exemplary embodiments and are meant to identify movement in opposite directions in the same plane.

The materials described hereinafter as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the development of the invention.

Referring now to the figures, wherein like reference numerals represent like parts throughout the views, the present invention will be described in detail. An adjustment system is adapted to adjust the height of a machine. Additionally, the adjustment system is adapted to adjust the height of a mobile asset or vehicle. Further, the adjustment system is adapted to adjust the height of an agricultural vehicle carrying a crop sprayer to enable mature crops to be more efficiently sprayed, while not disturbing or damaging the crops.

Referring now to FIG. 1, a perspective view of a machine 10 is illustrated. The machine 10 can be a mobile asset or vehicle. As shown, the machine 10 is an agricultural vehicle that can spray row crops, such as corn and the like.

The machine 10 comprises a chassis 20, a leg 30, and at least three wheels 40. The chassis 20 is a frame for the machine 10 and provides the necessary stability. The wheels 40 have a circular frame that facilitates movement or transportation of the machine 10. The legs 30 connect the chassis 20 to the wheels 40.

Figure 8:
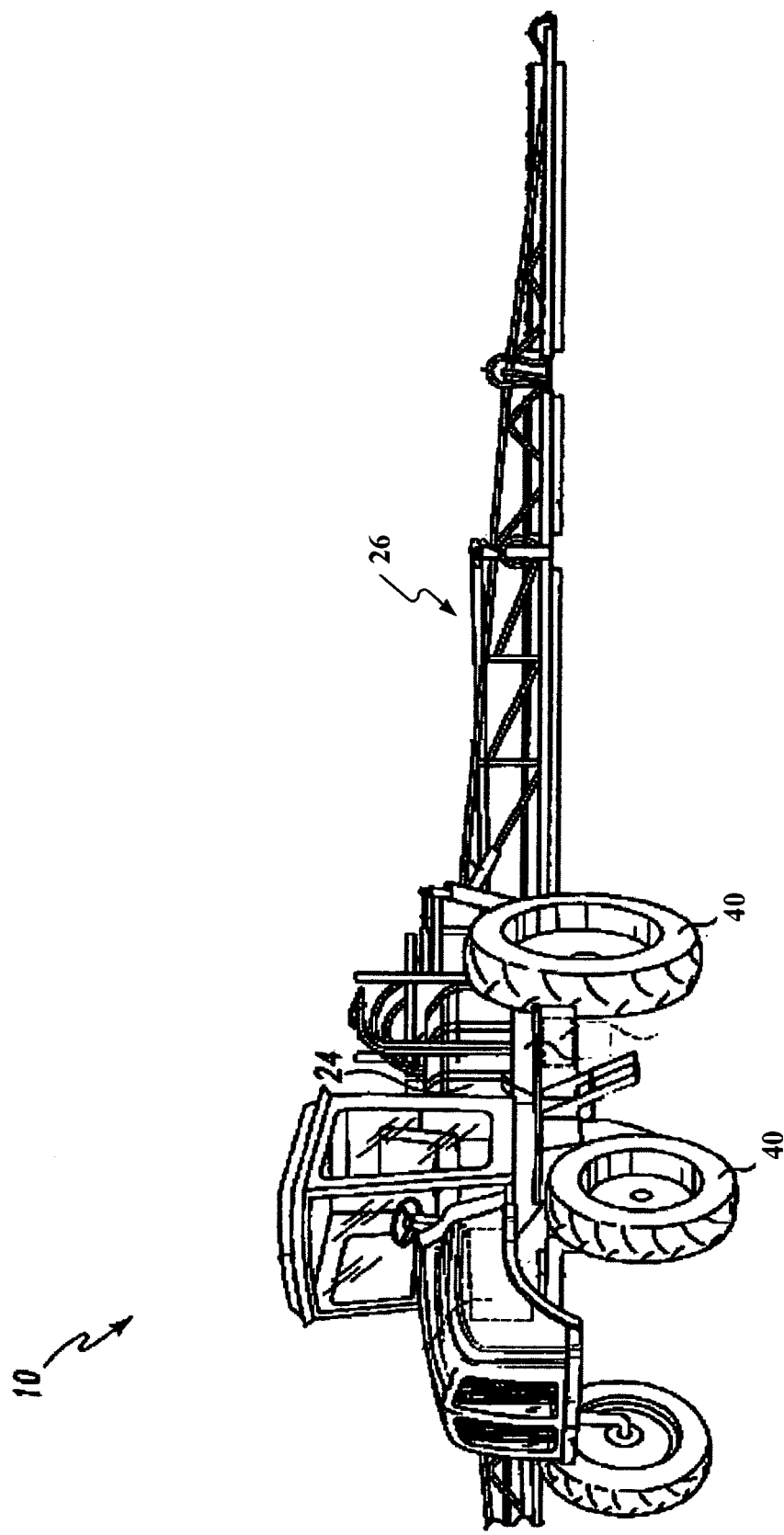
FIG. 8 shows a machine carrying a spraying mechanism.

The machine 10 can also include a cab 50 for the operator to sit in/control the machine 10, a frame 60 for carrying the cab 50 atop the chassis 20, and a motor 70 for operating the machine 10. As shown in FIG. 8, optionally, the machine 10 can carry a spraying mechanism 24 for providing a spray material, such as a pesticide or fungicide, to a crop through a boom 26.

In one aspect of the present invention, an adjustment system 100, or adjustment assembly, replaces a conventional leg 30 of the machine 10. The adjustment system 100 is adapted to enable the chassis 20 to be dynamic, rather than static. For instance, the adjustment system 100 is adapted to move the chassis up and down with respect to a surface 5. By being able to move up and down, the gap or distance between the chassis 20 and the surface 5, for instance a crop, can be altered. Additionally, the adjustment system 100 can perform as a suspension system, dampening the effects of the terrain with respect to the cab 50.

Figure 2A:
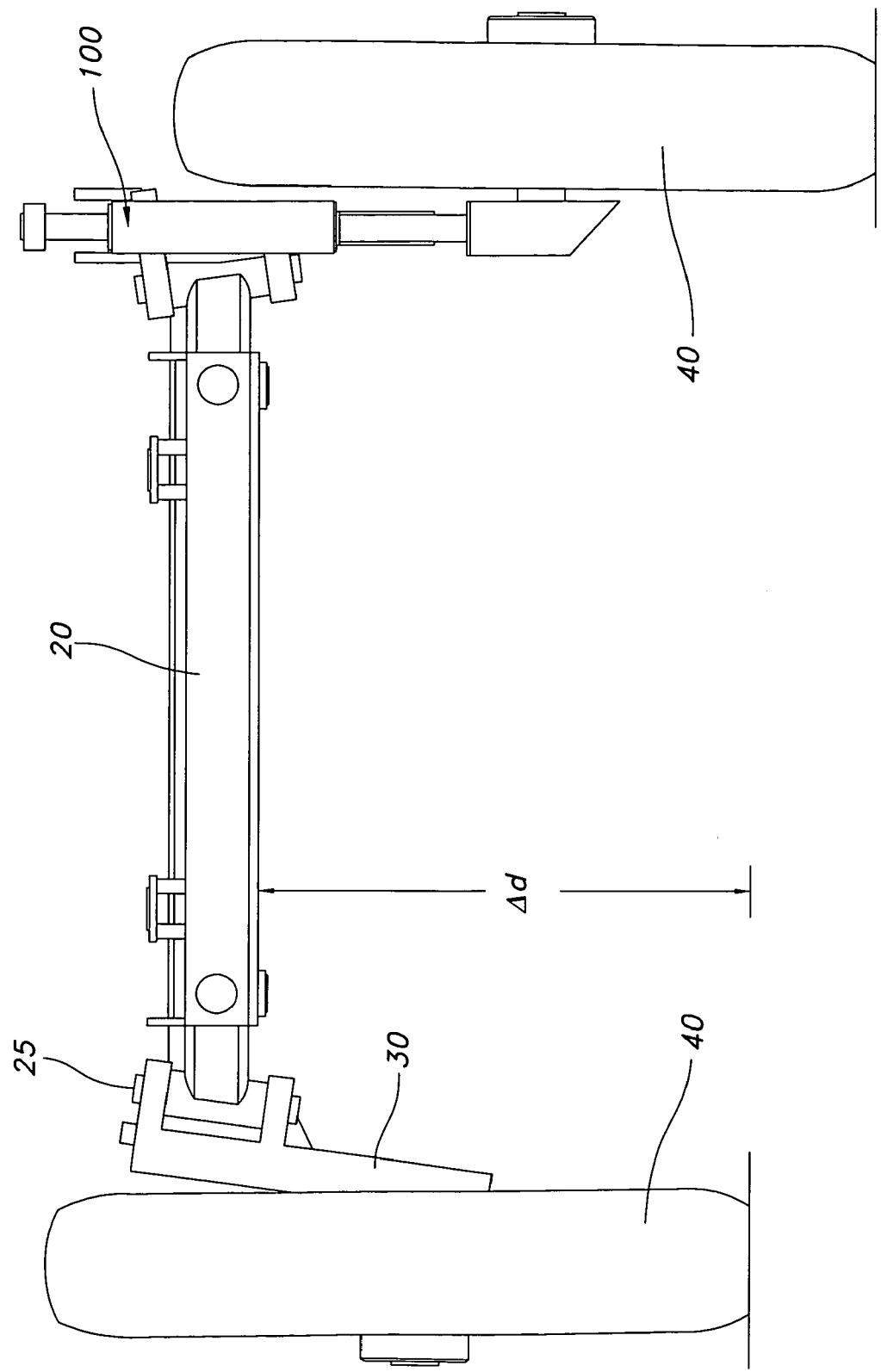
FIG. 2A is a front view of a chassis of the machine having two wheels comprising the adjustment system, in accordance with an exemplary embodiment of the present invention.
Figure 2B:
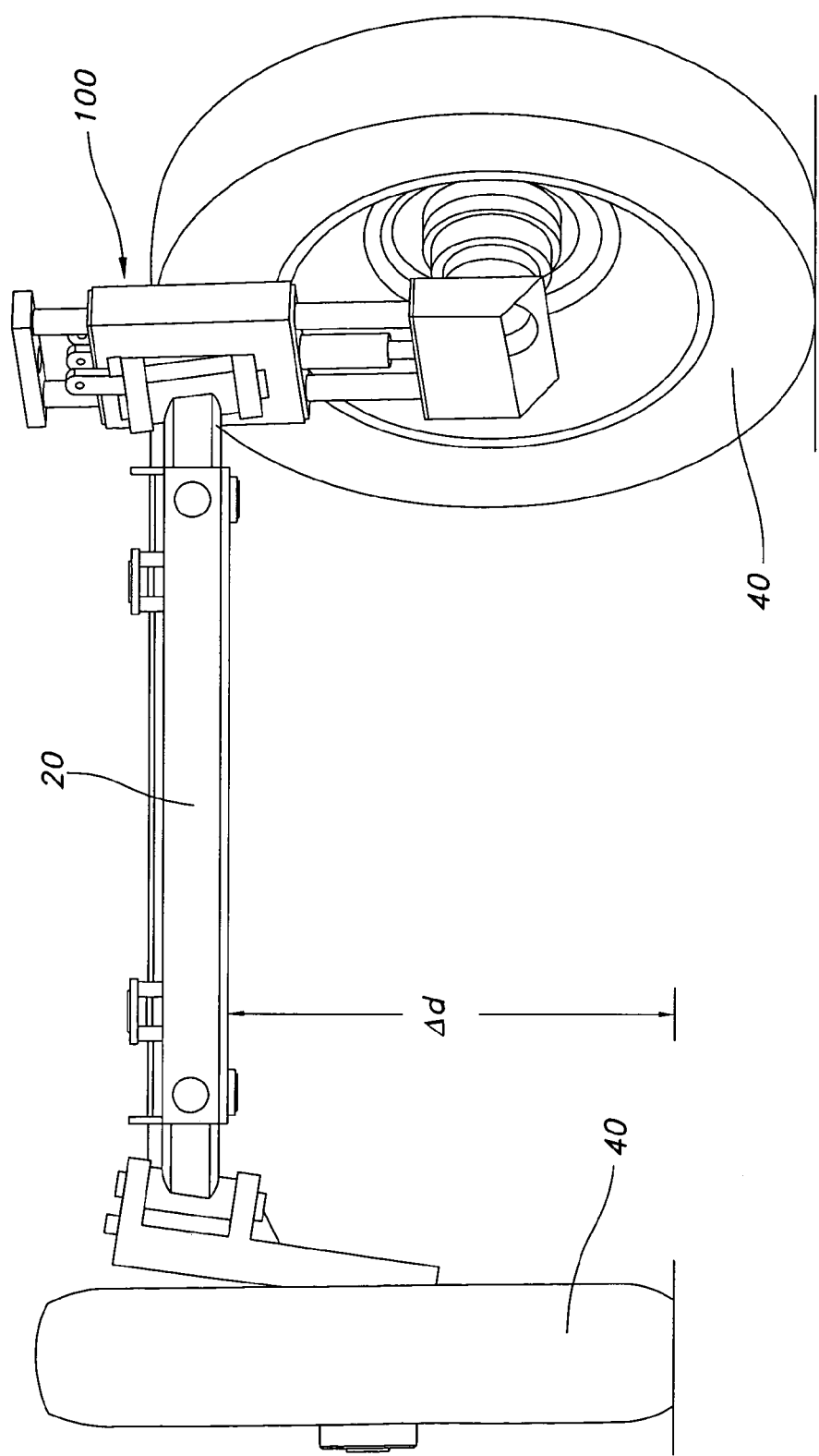
FIG. 2B is another front view of a chassis of the machine having two wheels, one of which is turned; the machine comprises the adjustment system, in accordance with an exemplary embodiment of the present invention.

As shown in FIGS. 2A-2B, the adjustment system 100 can be coupled to both the chassis 20 and the wheel 40. FIGS. 2A-2B also illustrates the rise of the chassis 20, due to the adjustment system 100. By way of illustration, the conventional connection between the chassis 20 and the wheel 40 is illustrated on the left side of these figures. In such, the distance from the surface 5 to the chassis 20 is Δd, a fixed value. That is, with the conventional connection, the chassis 20 remains a constant distance from the surface 5.

In contrast, with the adjustment system 100, the distance from the surface 5 to the chassis 20 is variable. For example, the distance between the chassis 20 and the surface 5 can be altered as needed, such that the chassis 20 ascends and descends with respect to the surface 5, or with respect to the crop to be sprayed. Thus, the distance from the chassis 20 to the surface 5 can be at a minimum Δd, and can extend to a longer distance. Exemplarily, the adjustment system 100 can provide at least 8 to 12 inches more distance between the chassis 20 and the surface 5 than the conventional, static leg 30.

Figure 3:
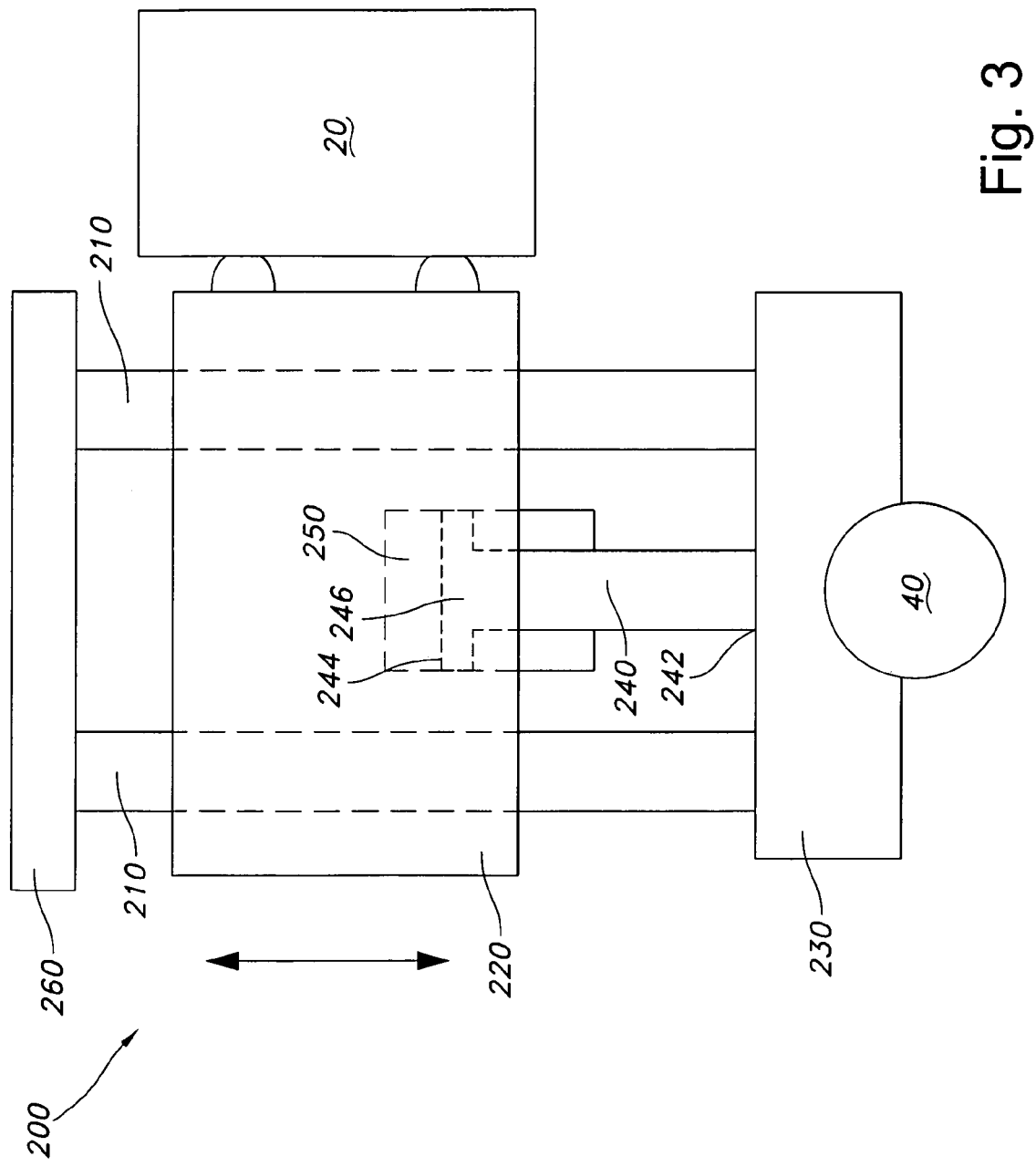
FIG. 3 is a side, partial cross-sectional view of a portion of the adjustment system, in accordance with an exemplary embodiment of the present invention.

Referring now to FIG. 3, one aspect of the adjustment system 100 is illustrated. The adjustment system 100 can comprise a hydraulic assembly 200. The hydraulic assembly 200 can include one or more rods 210, a body 220, a base 230, a hydraulic rod 240, and a hydraulic chamber 250. The hydraulic assembly 200 can cause the adjustment system 100 to expand or contract, thereby increasing or decreasing the distance between the chassis 20 and the surface 5 accordingly.

The adjustment system 100 can have preferably one or two rods 210, but more rods may be implemented. As illustrated in FIG. 3, there are two rods 210. The rods 210 extend from the base 230 to a connection element 260, which connects the rods 210 to each other. Each rod 210 can be fixed at its respective ends, with one end fixed at the base 230 and the other at the connection element 260. In an exemplary embodiment, the rod 210 can be a strut rod for stabilizing the adjustment system 100. The base 230 connects the rods 210 and the remainder of the adjustment assembly 100 to the wheel 40.

In one aspect, the connection element 260 and the base 230 are fixed elements. Oppositely, the body 220, or outer tube, of the adjustment system 100 can move based on the characteristics of the hydraulic chamber 250 operating via the hydraulic rod 240.

The hydraulic rod 240 is preferably fixed at a first end 242 to the base 230. A second end 244 of the hydraulic rod 240 is housed within the hydraulic chamber 250. Preferably, the hydraulic rod 240 includes a collar 246 in proximity to the second end 244 to prohibit the hydraulic rod 240 from exiting the chamber 250. Additionally, the collar 246 can prevent hydraulic fluid from escaping the chamber 250. In operation, the hydraulic fluid in the chamber 250 can increase or decrease. As the fluid in the chamber 250 increases, the pressure pushes downwardly, or pushes more of the rod 240 out of the chamber 250, and thus moves the body 220 upwardly. Consequently, the body 220 moves up and down depending on the amount of hydraulic fluid that is contained in the chamber 250. In an exemplary embodiment, this can extend the length of distance between the chassis 20 and the surface 5.

On the other hand, as the fluid decreases, the pressure pushes upwardly, or more of the rod 210 is contained within the chamber 250. As a result, the body 220 falls downwardly. In an exemplary embodiment, this can reduce the length of distance between the chassis 20 and the surface 5, i.e., it can raise the height of the agricultural vehicle.

The hydraulic chamber 250 is at least partially disposed within the body 220, and the hydraulic rod 240, in essence, moves up and down within the chamber 250 causing the body 220 to move up and down. The body 220 is in communication with the chassis 20. Specifically, the body 220 can be coupled to the chassis 20. In addition, the base 230 is in communication with the wheel 40.

Figure 4:
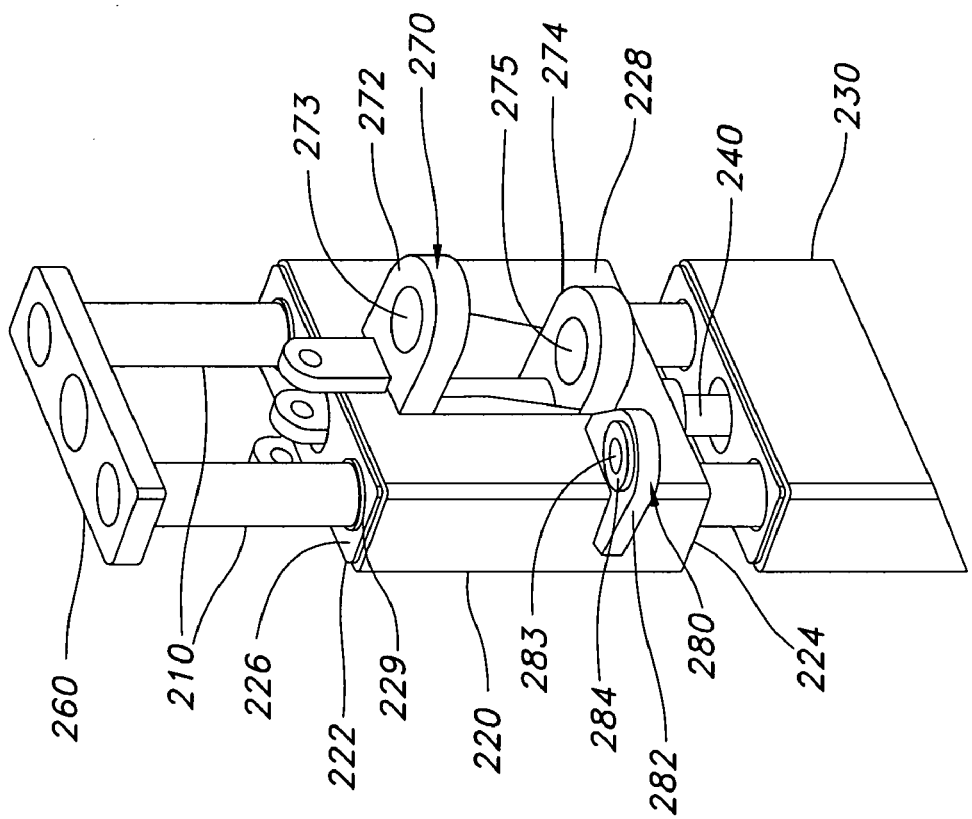
FIG. 4 is a front side, perspective view of the adjustment system, in accordance with an exemplary embodiment of the present invention.
Figure 5:
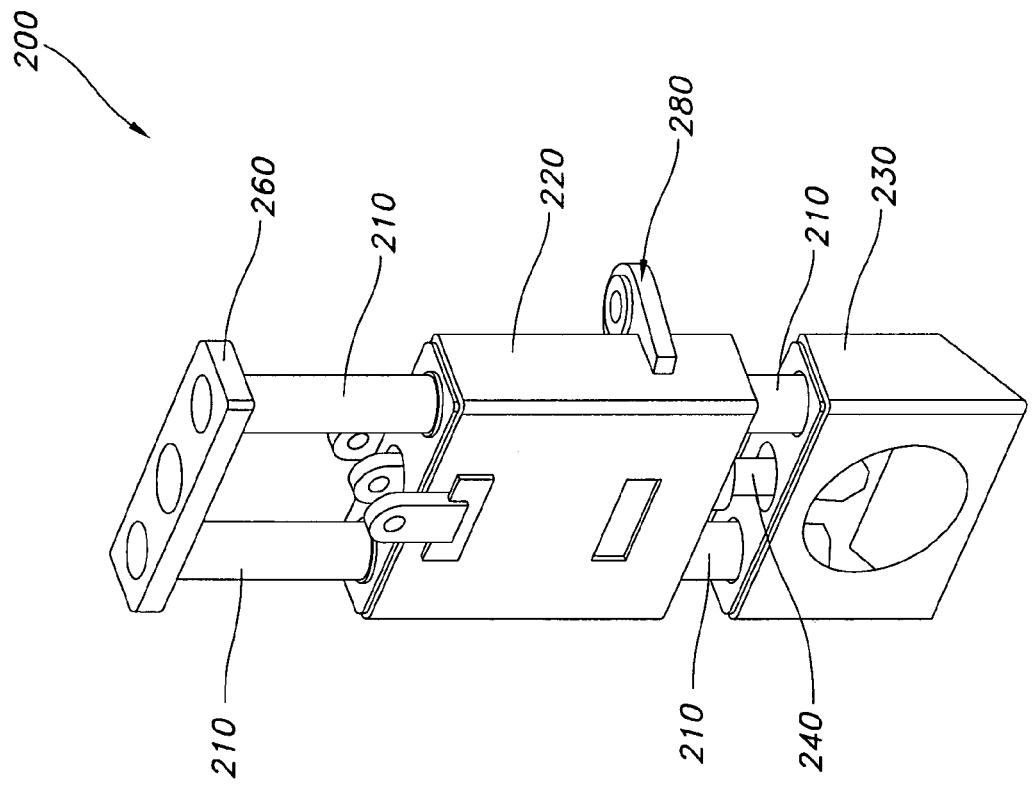
FIG. 5 is a rear side, perspective view of the adjustment system, in accordance with an exemplary embodiment of the present invention.
Figure 6:
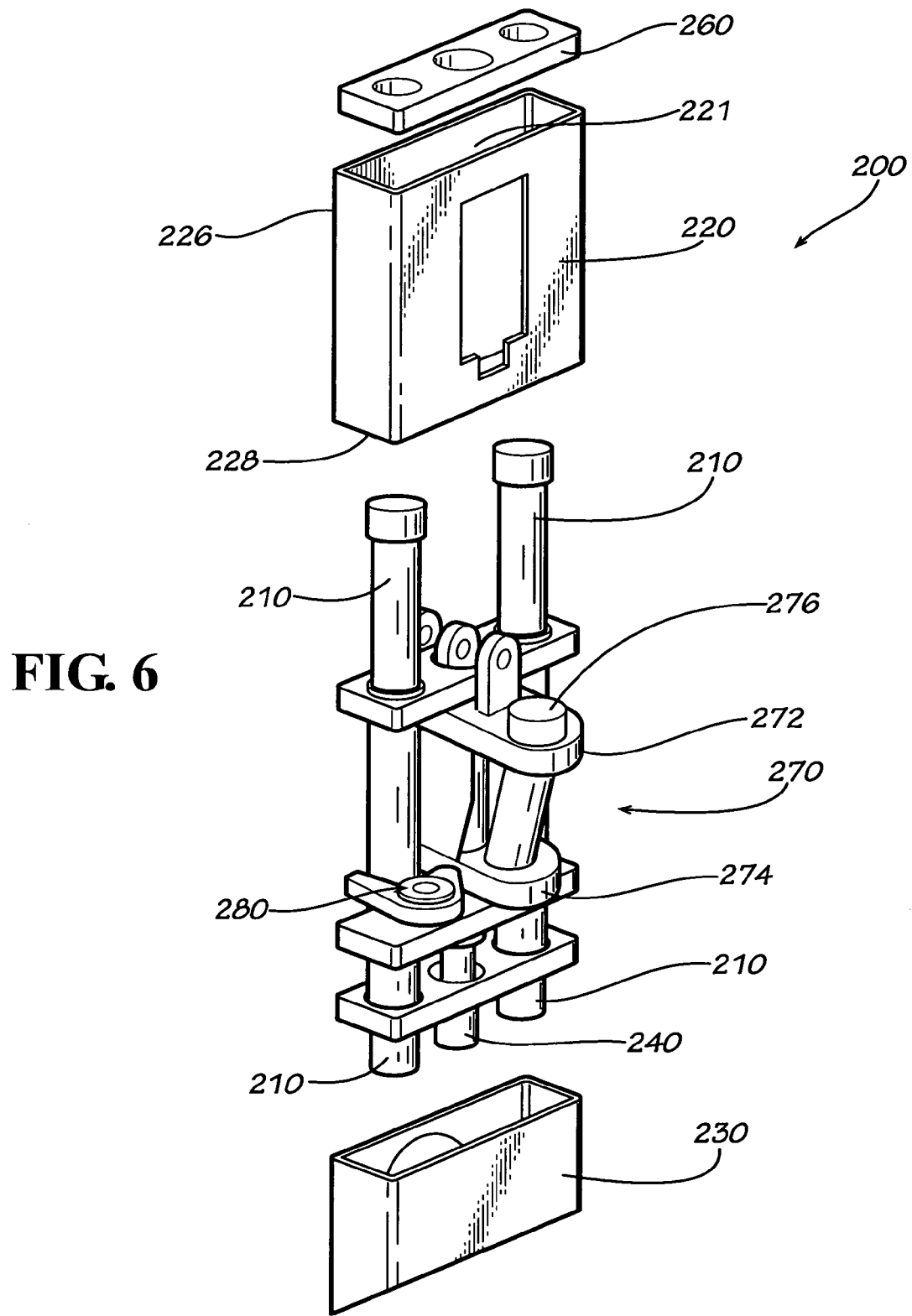
FIG. 6 is a front side, partially exploded, perspective view of the adjustment system, in accordance with an exemplary embodiment of the present invention.
Figure 7:
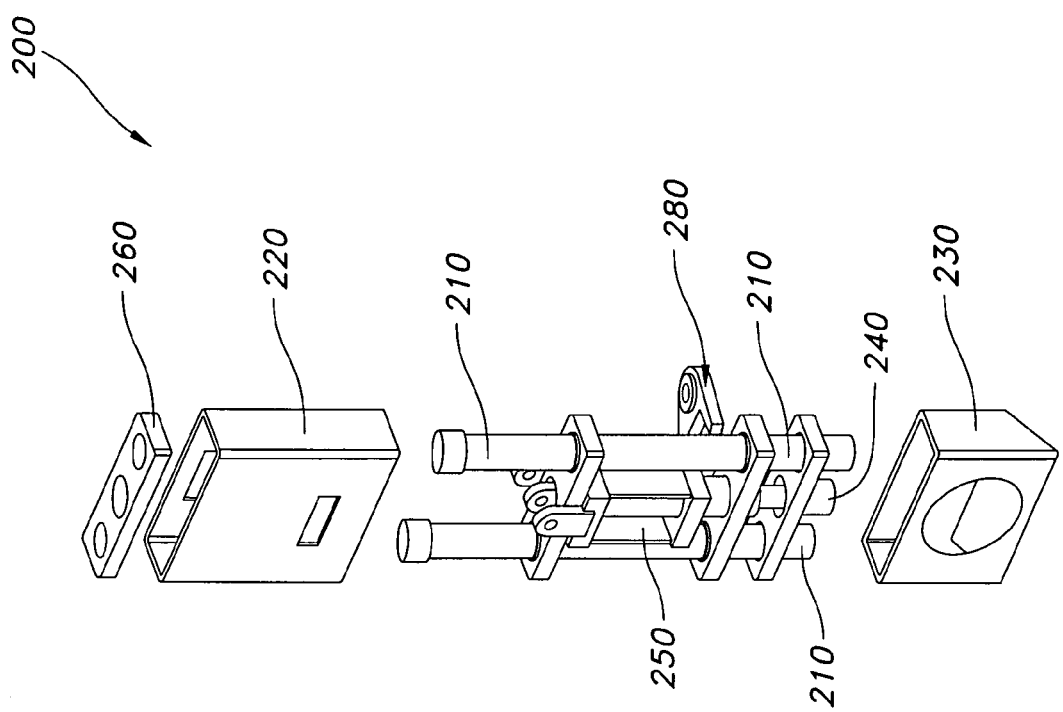
FIG. 7 is a rear side, partially exploded, perspective view of the adjustment system, in accordance with an exemplary embodiment of the present invention.

FIGS. 4-5 illustrate front and rear perspective views of the adjustment system 100, respectively. FIGS. 6-7 are partially exploded, front and rear side perspective views of the adjustment system 100, respectively. As illustrated in FIGS. 4-7, the adjustment system 100 includes the rod(s) 210, the body 220, the base 230, the hydraulic rod 240, the connection element 260, a chassis connection assembly 270, a steering connection assembly 280, and first and second guide blocks 222 and 224.

The body 220 carries the chassis connection assembly 270 and the steering connection assembly 280. Additionally, the body 220 can receive and contain both the first and second guide blocks 222 and 224.

The chassis connection assembly 270 connects the body 220 to the chassis 20 and the wheel 40. In one aspect, the chassis connection assembly 270 includes first and second kingpin lugs 272 and 274 for connecting the adjustment system 100 to the chassis 20. The first and second kingpin lugs 272 and 274 extend outwardly from the body 220 of the adjustment system 100. The first and second kingpin lugs 272 and 274 can be in communication with the chassis 20 of the machine. Each of the kingpin lugs 272 and 274 define an aperture therein, namely apertures 273 and 275, respectively. Preferably, a fixation element 276, such as a pin or like device, can be inserted into the apertures 273 and 275 of the first and second kingpin lugs 272 and 274, respectively. The fixation element 276 can also be inserted through an aperture 25 of a terminus of the chassis 20 (see FIG. 1). Accordingly, the fixation element 276 extends through the aperture 273 of the first kingpin lug 272, through the aperture 25 in the chassis 20, and through the aperture 275 of the second kingpin lug 274. As the body 220 of the adjustment system 100 moves, the chassis 20 can move. Preferably, the chassis 20 moves parallel to the body 220.

In addition, first and second guide blocks 222 and 224 can be positioned, respectively, at opposing ends 226 and 228 of the body 220. The first and second guide blocks 222 and 224 are receivable into the opposing ends 226 and 228 of the body 220. In an exemplary embodiment, the guide blocks 222 and 224 help guide the body 220 along the length of the rods 210. The guide blocks 222 and 224 can define two apertures to receive the rods 210. Moreover, each aperture can be lined with a slide bushing 229 further enabling the movement of the body 220 with respect to the rods 210.

Figure 9:
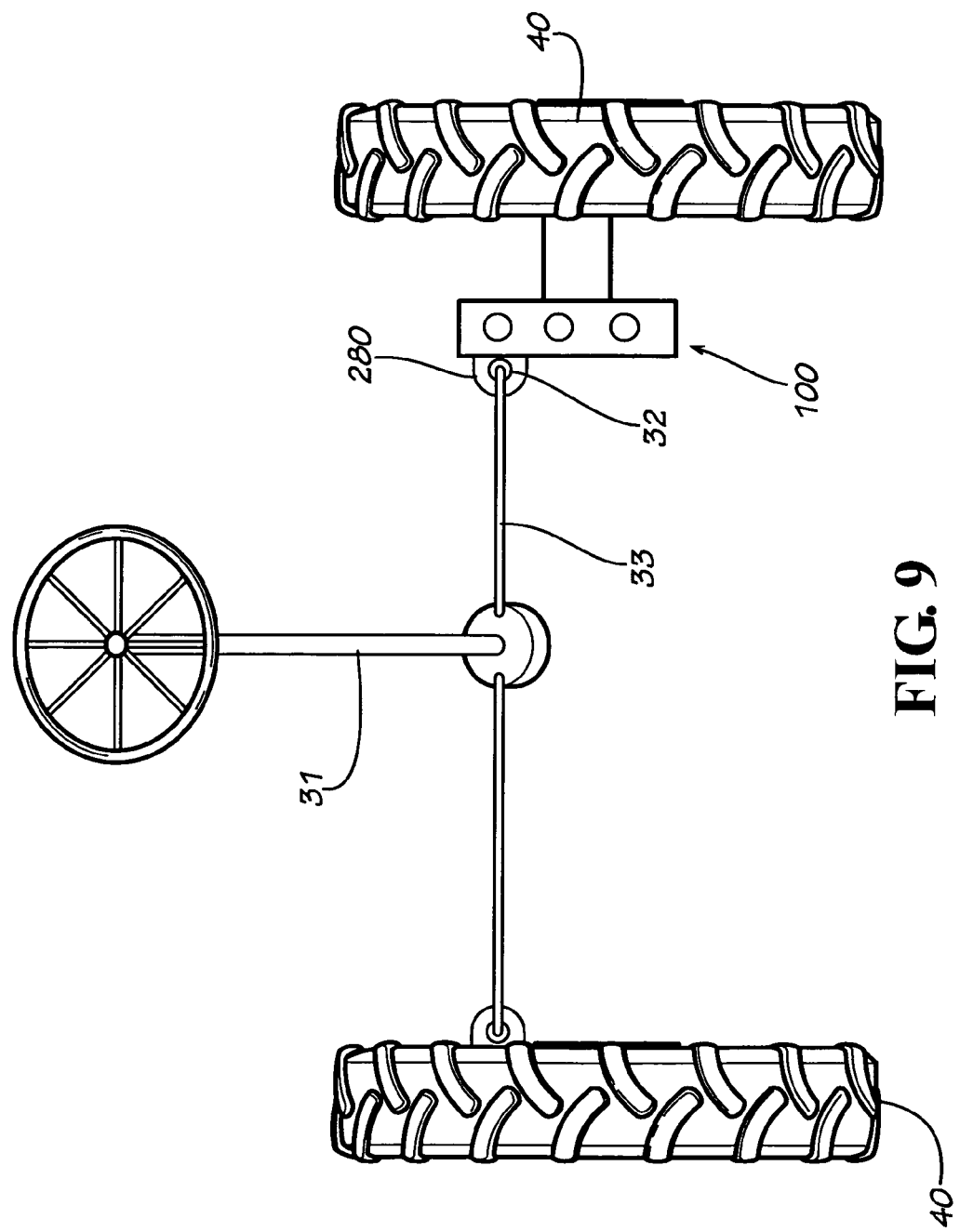
FIG. 9 shows a steering column.

The steering connection assembly 280 can be coupled to a steering column 31 of the machine 10, and can assist steering the wheels 40 in the direction desired. Preferably, the steering connection assembly 280 comprises a steering lug 282 defining an aperture 283. Accordingly, as shown in FIG. 9, a fixation element 32 such as a pin or like device, can be inserted through a terminus 33 of the steering column 31 and through the aperture 283 of the steering lug 282. Additionally, a bushing 284 can line the perimeter of the aperture 283 of the steering lug 282. In essence, the bushing 284 performs as a bearing between the moving objects. For instance, the fixation element 32, which is insertable into the aperture 283 of the steering lug 282, can rotate based on steering of the machine, and the bushing assists with this movement.

Additionally, the body 220 can define a cavity 221. Each of the first and second kingpin lugs 272 and 274, the steering lug 282, the bushing 284, and other components of the steering connection assembly 280 can be at least partially disposed within the cavity 221. As such, the body 220 can cover and protect these components.

Accordingly, the body 220 includes first and second guide blocks 222 and 224 within its opposing ends 226 and 228, a chassis connection assembly 270 that includes at least two kingpin lugs 272 and 274 extending from the body 220, and the steering connection assembly 280 also extending from the body 220.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. An adjustment system for adjusting the height of an agricultural machine, the adjustment system comprising:
    a base;
    a connection element;
    a hydraulic assembly adapted to contract and expand;
    a first rod fixed at a first end to the base and at a second end to the connection element;
    a second rod fixed at a first end to the base and at a second end to the connection element;
    a body defining a cavity for receiving the hydraulic assembly, the first and second rods extending through a length of the body; and
    a chassis connection assembly extending outwardly from one side of the body for connecting the body to a chassis of the agricultural machine, the connection element stabilizing the first and second rods at the first end of the first and second rods, the body adapted to move based on a characteristic of the hydraulic assembly, the body moving along the first and second rods, the chassis of the agricultural machine moving parallel to movement of the body.

2. The adjustment system of claim 1, the base coupled to a wheel of the agricultural machine.

3. The adjustment system of claim 2, further comprising a steering connection assembly for connecting a steering column of the agricultural machine to the adjustment system, such that steering via the steering column is transmitted to the wheel of the agricultural machine.

4. The adjustment system of claim 1, further comprising a first guide block and a second guide block, the first and second guide blocks positioned at opposing ends of the body, the guide blocks guiding the body along the first and second rods.

5. The adjustment system of claim 1, the distance between the base and chassis increasing as the hydraulic assembly expands, and decreasing as the hydraulic assembly contracts.

6. The adjustment system of claim 5, the hydraulic assembly adapted to substantially fix the distance between the base and chassis at a desired height.

7. An agricultural machine comprising:
    a chassis;
    a wheel;
    an adjustment system for adjusting the height of the chassis with respect to the wheel, the adjustment system adapted to fix the chassis at a desired height with respect to the wheel, and the adjustment system coupled to both the chassis and the wheel, the adjustment system comprising:
        a hydraulic assembly for actuating the adjustment system, the hydraulic assembly adapted to contract and expand, wherein contraction of the hydraulic assembly lowers the chassis and expansion of the hydraulic assembly raises the chassis;
    a base for connecting the adjustment system to the wheel;
    a connection element;
    a first rod fixed at a first end to the base and at a second end to the connection element;
    a body defining a cavity for receiving the hydraulic assembly, the first rod extending through a length of the body, the body adapted to move based on a characteristic of the hydraulic assembly;
    a second rod fixed at a first end to the base and at a second end to the connection element, the second rod extending through a length of the body, the body moving along the first rod and the second rod; and
    a chassis connection assembly extending outwardly from one side of the body for connecting the body to a chassis of the agricultural machine.

8. The agricultural machine of claim 7, further comprising a spraying mechanism adapted for spraying crops.

9. The agricultural machine of claim 7, the adjustment system adapted to raise the chassis at least 8 inches from a lowest position of the chassis.

10. The agricultural machine of claim 7, the body coupled to the chassis.

11. The agricultural machine of claim 7, further comprising the chassis connection assembly connecting the body to the chassis and the wheel, the chassis connection assembly comprising:
   a first kingpin lug defining a first aperture;
   a second kingpin lug defining a second aperture, the first and second kingpin lugs adapted to connect the adjustment system to the chassis; and
   a fixation element adapted to insert into the first and second apertures and into a terminus of the chassis.

12. The agricultural machine of claim 7, the adjustment system adapted to raise the chassis such that the chassis remains above a surface at a substantially fixed distance from the surface as the wheel rotates.

13. The agricultural machine of claim 7, the adjustment system further adapted to operate as a suspension system.

14. The agricultural machine of claim 7, the first rod configured for stabilizing the body.

15. An agricultural machine comprising:
   a chassis;
   a wheel;
   an adjustment system for adjusting the height of the chassis with respect to the wheel, the adjustment system adapted to fix the chassis at a desired height with respect to the wheel, and the adjustment system coupled to both the chassis and the wheel, the adjustment system comprising:
      a hydraulic assembly for actuating the adjustment system, the hydraulic assembly adapted to contract and expand, wherein contraction of the hydraulic assembly lowers the chassis and expansion of the hydraulic assembly raises the chassis;
      a base for connecting the adjustment system to the wheel;
      a connection element;
      a first rod fixed at a first end to the base and at a second end to the connection element;
      a body defining a cavity for receiving the hydraulic assembly, the first rod extending through a length of the body, the body adapted to move based on a characteristic of the hydraulic assembly, the body moving along the first rod and a second rod; and
      a chassis connection assembly connecting the body to the chassis and the wheel, the chassis connection assembly comprising;
         a first kingpin lug defining a first aperture,
         a second kingpin lug defining a second aperture, the first and second kingpin lugs adapted to connect the adjustment system to the chassis, and
         a fixation element adapted to insert into the first and second apertures and into a terminus of the chassis.

16. The agricultural machine of claim 15, further comprising a spraying mechanism adapted for spraying crops.

17. The agricultural machine of claim 15, the body coupled to the chassis.

18. The agricultural machine of claim 15, the adjustment system adapted to raise the chassis such that the chassis remains above a surface at a substantially fixed distance from the surface as the wheel rotates.

19. The agricultural machine of claim 15, the adjustment system further adapted to operate as a suspension system.

20. The agricultural machine of claim 15, the first rod configured for stabilizing the body.

\* \* \* \* \*